United States Patent Office.

FRANK H. FISCHEDICK AND CHARLES E. KOECHLING, OF NEW YORK, N. Y.

BROMINE COMPOUND.

SPECIFICATION forming part of Letters Patent No. 462,544, dated November 3, 1891.

Application filed October 11, 1890. Serial No. 367,830. (Specimens.)

*To all whom it may concern:*

Be it known that we, FRANK H. FISCHEDICK and CHARLES E. KOECHLING, of New York, in the county and State of New York, have invented a new and useful composition of matter to be used as a medicine for the cure of nervous excitement, insomnia, headache, and neuralgia and for use as an antipyretic, of which the following is a specification.

This new chemical compound results when aniline, alcohol, and bromine are combined in accordance with the following formula: aniline, pure, one part; alcohol, pure, five parts. Mix and form a solution, to which gradually add bromine until strong reaction ceases—*i. e.*, until ebullition ceases—then warm the mixture to about 200° Fahrenheit and continue to add bromine until about six parts have been combined with the other ingredients or until the color of bromine begins to be imparted to the solution. After cooling the composition drain the liquid from the crystals formed and wash them with alcohol, then redissolve them in hot alcohol. This in cooling will deposit the purified crystal, which may be dried on bibulous paper.

The product is preferably designated as "bromamid," and when prepared, as has been stated, assumes the form of small, white, needle shape, brilliant, and nearly tasteless crystals having a faint aromatic odor.

The chemical name of the compound is "Tribrom Bromanilid," and the rational formula of this product is as follows:

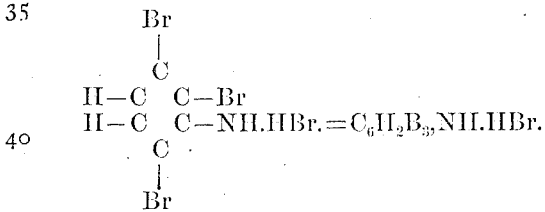

This new compound is practically insoluble in hot or cold water and is insoluble in cold alcohol, nitric or hydrochloric acids or benzine. It dissolves freely in fifteen parts of boiling alcohol, crystallizing out on cooling, or precipitating from the hot alcohol by the addition of hot water. It is soluble in fourteen parts of chloroform and in ten parts of ether.

Fixed and volatile oils and strong sulphuric acid will also dissolve the new compound, and when heated with strong sulphuric acid it is not changed; but if binoxide of manganese is added and the compound again heated bromine is liberated.

Boiling acids do not break up the chemical composition of bromamid, which can be readily precipitated from such solutions by admixture of water, the precipitate assuming the normal crystalline form. Slight boiling with alkalies also fails to destroy the compound. Long-continued boiling with alkalies does, however, break up the chemical composition of the compound.

My compound has all the characteristics of the anilides as to being a readily crystallizable, a very insoluble, and a very stable salt, only being affected after long-continued boiling with caustic alkilies. To all the tests which are characteristic of the aniline salts it reacts negatively, does not give a precitate with nitrate-of-silver solution, (test for simple bromides,) nor is it affected, nor is bromine liberated, if boiled with concentrated acid, nor is the odor of aniline oil developed. The melting-point is 243° Fahrenheit, and the compound volatilizes at 310° Fahrenheit without residue, the vapors on cooling forming small feathery crystals.

The foregoing-enumerated properties and tests prove the composition to be a definite, new, and stable chemical compound. The dose is from five to eight grains every three hours.

What we claim, and desire to secure by Letters Patent, is—

The composition of matter hereinbefore described derived from aniline, alcohol, and bromine, combined in about the proportions named, and characterized by solubility in hot alcohol, chloroform, ether, concentrated sulphuric acid, and in the fixed coils, and by insolubility in hot or cold water, cold alcohol, and benzine, and also characterized by remaining unchanged when boiled with concentrated acids, and only being affected by strong solutions of caustic alkalies after a long-continued boiling, and even then without the odor of aniline oil, as described.

FRANK H. FISCHEDICK.
CHARLES E. KOECHLING.

Witnesses:
WM. P. PATTON,
C. SEDGWICK.